340-566

XR 3,656,100

United States
Beltrami

[15] 3,656,100
[45] Apr. 11, 1972

[54] ANTI-HIJACKING VEHICULAR ALARM SYSTEM

[72] Inventor: Joseph P. Beltrami, Garfield, N.J.
[73] Assignee: Itad Alarm Systems, Inc., Garfield, N.J.
[22] Filed: May 8, 1970
[21] Appl. No.: 35,606

[52] U.S. Cl..............................340/63, 340/276, 307/10
[51] Int. Cl.......................................................B60r 25/10
[58] Field of Search....................340/63, 64, 65, 276, 278; 307/10

[56] References Cited

UNITED STATES PATENTS

| | | | |
|---|---|---|---|
| 3,310,775 | 3/1967 | Birth | 340/63 |
| 2,892,181 | 6/1959 | Benson et al. | 340/64 |
| 3,197,734 | 7/1965 | Kennell | 340/65 |
| 3,242,460 | 3/1966 | Morrell | 340/64 |

*Primary Examiner*—Alvin H. Waring
*Attorney*—Samuelson & Jacob

[57] ABSTRACT

In an anti-hijacking vehicular alarm system in which an alarm is to be actuated upon unauthorized opening of a door of a vehicle, alarm circuit means for actuating the alarm in response to the opening of a vehicle door, operator means for selectively activating or deactivating the alarm circuit means, timer means capable of being actuated to operate for a selected interval of time, means for precluding operation of the operator means during the selected interval of time without actuation of the alarm, and means for precluding alteration of the duration of the selected interval of time during that interval without actuation of the alarm.

15 Claims, 4 Drawing Figures

INVENTOR
JOSEPH P. BELTRAMI
BY
Lemelson & Jacob
ATTORNEYS

ANTI-HIJACKING VEHICULAR ALARM SYSTEM

Reference is made to Disclosure Document No. 001,441, filed Feb. 26, 1970, which discloses subject matter related to the present invention.

The present invention relates generally to vehicular alarms and pertains, more specifically, to an alarm system especially suited for the prevention of the hijacking of trucks and like vehicles.

Alarm systems are presently available for the purpose of warding off the burglary or theft of vehicles such as cars and trucks; however, these systems are not effective against hijacking. Thus, in some commercially available systems for trucks, for example, the cab of the truck is protected by an alarm which is responsive to the opening of a cab door. The driver of the truck may set, or activate, the alarm to operate either while he is in the cab or after he has left the cab so that any unauthorized opening of a cab door will actuate or sound the alarm. Since such a system is always under the direct control of the driver, an armed hijacker can compel the driver to totally deactivate, or in some way defeat, the operation of the alarm prior to entry of the hijacker into the truck. In addition, the driver often neglects to activate the alarm system while he is present in the truck, thereby defeating any value the system may otherwise have in a hijacking incident.

Other systems are available which operate an alarm in response to unauthorized starting of the engine of the vehicle. In these systems, a special key-operated electrical switch is placed in the vehicle's ignition circuit. Any attempt to start the engine without first inserting the special alarm key and operating the switch results in the sounding of an alarm. Here again, the driver of the vehicle is in possession of the special alarm key and may be compelled to use it, thus rendering such a system ineffectual against hijackers.

Thus, although presently available vehicle alarm systems may offer some degree of protection against the theft or pilfering of an unattended vehicle, such systems offer little or no protection against hijacking, presently one of the largest of cargo loss factors.

It is therefore an important object of the invention to provide a vehicular alarm system which is effective against hijacking.

Another object of the invention is to provide a vehicular alarm system which exhibits all of the advantages of present alarm systems in preventing theft and burglary, but also achieves protection against hijacking.

A further object of the invention is to provide a vehicle alarm system which achieves protection against hijacking by assuring that the alarm system is activated while the vehicle is in operation and by seeing to it that the vehicle operator cannot deactivate the alarm system at will so that he cannot be compelled by a hijacker to deactivate the system.

A still further object of the invention is to provide a vehicular alarm system as set forth above which is relatively inexpensive and is easy to install and use.

The above objects as well as still further objects and advantages are attained by the invention which may be described briefly as an anti-hijacking vehicular alarm system in which an alarm is to be actuated upon unauthorized opening of a door of the vehicle, the vehicle including an ignition circuit, the alarm system comprising alarm circuit means for actuating the alarm in response to the opening of a vehicle door, operator means for selectively activating or deactivating the alarm circuit means, timer means capable of being actuated to operate for a selected interval of time, means for precluding operation of the operator means during the selected interval of time without actuation of the alarm, and means for precluding alteration of the duration of the selected interval of time during that interval without actuation of the alarm.

The invention will be more fully understood, while still further objects and advantages will become apparent, from the following detailed description of an embodiment of the invention illustrated in the accompanying drawing, in which.

Figure 1:
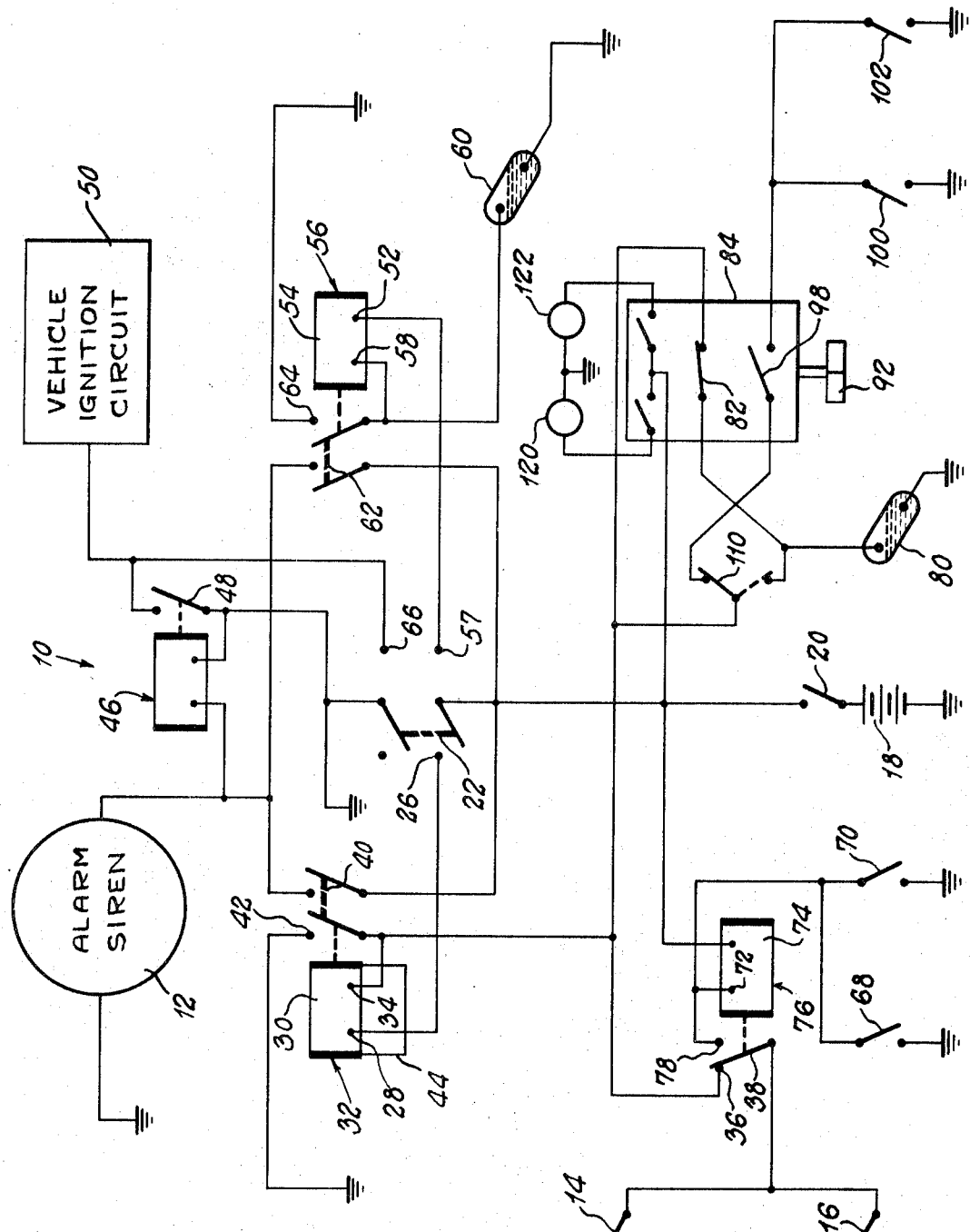
FIG. 1 is a schematic diagram of an alarm system constructed in accordance with the invention.

Referring now to the drawing, and especially to FIG. 1 thereof, a vehicular alarm system constructed in accordance with the invention is illustrated schematically at 10. Alarm system 10 is constructed for use in a truck having two cab doors. The system includes an audible alarm in the form of an alarm siren 12 which is to be actuated by either one of two cab door switches 14 and 16, each of which is located in the cab, one so as to be operated in response to the opening of one of the two doors of the cab and the other so as to be operated in response to the opening of the other of the two doors. Further such switches may be provided in the same circuit for further access points.

Electric power for actuation of the alarm siren is supplied by a battery 18 which may be switched into or out of the system 10 by means of a master switch 20. The master switch is a key-operated electrical switch and may be operated only by supervisory personnel at the vehicle's terminal, the key for the master switch being retained by supervisory personnel at the terminal. The master switch will turn the alarm system 10 completely on or completely off.

In series with the master switch is a double-pole driver switch 22 which is also key-operated. The operator, or driver, of the vehicle is provided with a key 24 (see FIGS. 3 and 4) for the driver switch 22 so that the operator may selectively turn the driver switch "on" or "off". When the driver switch 22 is in the "on" position, that is, thrown to the left as viewed in FIG. 1, the battery 18 is connected, via terminal 26 of switch 22 to one side 28 of the coil 30 of a first alarm relay 32. The other side 34 of the coil 30 is connected to terminal 36 of a first switch 38 which normally connects the terminal 36 to the cab door switches 14 and 16. Thus, upon the unauthorized opening of either cab door, a switch 14 or 16 will close thereby grounding side 34 of the coil 30 of the alarm relay 32 causing the alarm relay to actuate an alarm switch 40 to close the alarm switch and actuate the alarm siren 12. Since alarm relay 32 is a holding relay by virtue of the ground connection made at 42 when the relay 32 is actuated, the alarm will continue to sound as long as current is available at the alarm switch 40 even if the cab door is immediately closed and both cab door switches 14 and 16 are opened. In addition, the first alarm relay 32 employs a time delay mechanism 44 which will assure continued operation of the alarm siren 12 for a prescribed period, preferably at least 10 minutes, even though the driver switch 22 may be placed in the "off" position. At the same time that the alarm siren is actuated, an ignition relay 46 is actuated to close switch 48 which is connected to the ignition coil of the vehicle, should the vehicle have an ignition circuit 50, so as to ground the ignition coil and render the ignition circuit inoperative.

When the driver switch 22 is turned to the "off" position, that is, thrown to the right as viewed in FIG. 1, the first pole of the switch will connect the battery 18 to one end 52 of the coil 54 of a second alarm relay 56 via terminal 57 of switch 22. Connected to the other end 58 of the coil 54 is a motion-detecting switch 60 which is normally "off" when the vehicle is stationary, but which will switch "on" when the vehicle is moved so as to ground the other end 58 of the coil 54 and actuate the second alarm relay 56 which, in turn, will actuate a second alarm switch 62 to sound the alarm siren 12. The motion-detecting switch 60 may be chosen from any one of a variety of electrical switches which are responsive to movement, the illustrated switch 60 being in the form of a mercury switch arranged so as to electrically close the contacts of the switch when the vehicle moves. The second alarm relay 56 is also a holding relay by virtue of the ground connection made at 64 when the relay is actuated such that the alarm will continue to sound as long as current is available at the second alarm switch 60. The second pole of the driver switch 22 will ground the ignition coil of the vehicle, via terminal 66, and render the ignition inoperative when the driver switch is in the "off" position. Thus, should the vehicle be left unattended with the driver switch 22 in the "off" position, the ignition will be totally inoperative and the alarm will be activated to sound in response to any unauthorized movement of the vehicle.

In order to enable the authorized operator of the vehicle to enter or leave the cab when the master switch 20 is in the "on" position and the driver switch 22 is in the "on" position, alarm system 10 is provided with an IN switch 68 and and OUT switch 70, each of which is key-operated. The IN switch 68 is accessible from the outside of the cab while the OUT switch 70 is accessible from the inside of the cab. Assuming, now, that the operator wishes to enter the cab, first, the IN switch 68 is closed thereby grounding one end 72 of the coil 74 of a relay 76 in the alarm circuit to actuate the relay 76 which, in turn, actuates the switch 38 to disconnect the cab door switches 14 and 16 from the alarm relay 32 and to connect the cab door switches, via terminal 78 of switch 38, to the end 72 of the coil 74 of the relay 76. A cab door is then opened and the corresponding cab door switch 14 or 16 is closed so that the end 72 of the coil 74 of the relay 76 remains grounded through a cab door switch. Then, while the cab door remains open, the IN switch 68 is opened and the operator enters the cab. Upon closing the cab door, the ground connection to the end 72 of the coil 74 of the relay 76 is opened and the relay will return to its normal position thereby returning the switch 38 to the position illustrated in FIG. 1 to again activate the alarm circuit by connecting the cab door switches 14 and 16 to the alarm relay 32. Departure from the cab is carried out in precisely the same manner using the OUT switch 70 instead of the IN switch 68.

Both the IN switch and the OUT switch are preferably operated by means of the alarm key 24 and are pinned switches; that is, the alarm key 24 cannot be removed from either switch when the switch is in its closed position and may be removed only when the switch is open. Thus, in entering or leaving the cab, the IN switch or the OUT switch cannot be left in a closed position inadvertently since the vehicle operator must take the key out of the switch and can remove the key only when the switch is open.

The components of the alarm system 10 thus far described are adequate to protect the truck from unauthorized entry or from unauthorized movement while the truck is unattended. Further measures must be taken in order to protect the truck, and the cargo carried thereby, against hijacking in the presence of the authorized operator of the vehicle since such hijacking might ordinarily be carried out by merely forcing the operator to relinquish the alarm key 24 which operates the IN and OUT switches 68 and 70 or the driver switch 22. Thus, alarm system 10 requires that the authorized operator relinquish the key 24 to the alarm system for a prescribed period of time and during that period the key cannot be retrieved without sounding the alarm.

Assuming, now, that the authorized operator of the vehicle has entered the cab and that both the master switch 20 and the driver switch 22 are in their "on" positions, the vehicle still cannot be moved without sounding the alarm by virtue of a second motion-detecting switch 80 which is connected to the end 34 of the coil 30 of the alarm relay 32 via the closed switch 82. Any movement of the vehicle while the motion-detecting switch 80 is thus connected to the alarm relay 32 will close the motion-detecting switch and actuate the alarm relay to sound the alarm. The closed switch 82 is coupled to a timing means shown in the form of a clock-timer 84 and is normally closed when the clock-timer is at rest. In order to open switch 82 the clock-timer 84 must be actuated for a selected interval of time.

Figure 2:
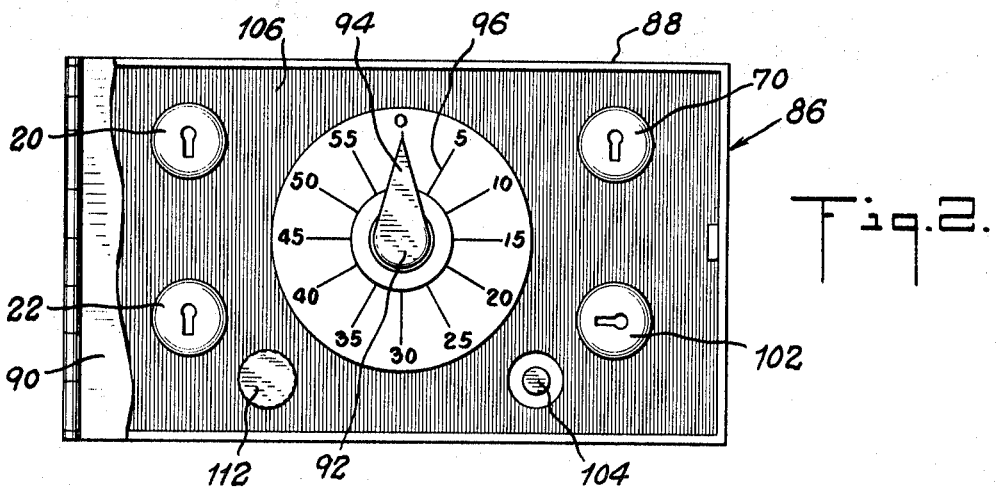
FIG. 2 is a front elevational view of the control box of the alarm system.
Figure 3:
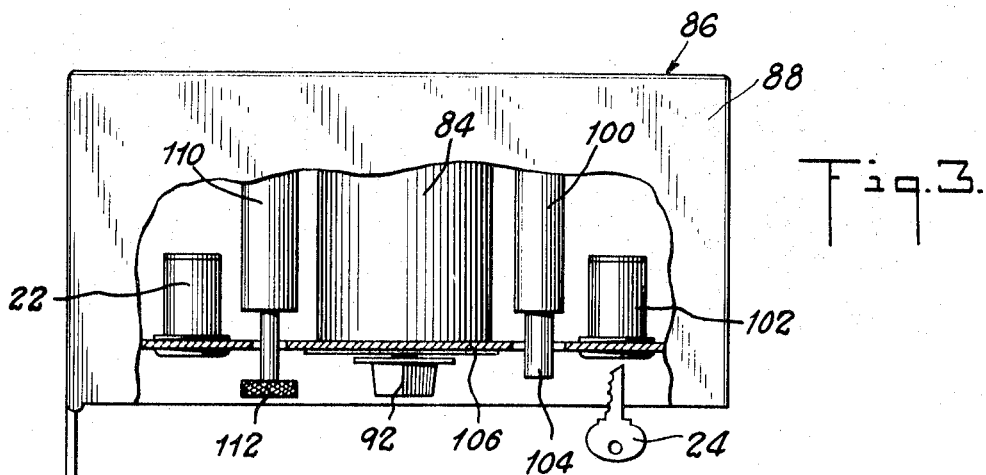
FIG. 3 is a top plan view of the control box of FIG. 2 with the access door thereof open.

As best seen in FIGS. 2 and 3, the clock-timer 84 is housed in a control box 86 which is mounted in a convenient location within the cab. The control box 86 includes a housing 88 which forms an enclosure around the clock-timer 84 and which has a hinged access door 90 that may close off access to the clock-timer. When the access door 90 is open, as seen in FIG. 3, the authorized driver of the vehicle may actuate the clock-timer 84 manually to select a predetermined timed interval by turning the knob 92 to set the timer to a time indicated by the pointer 94 and the scale 96. The driver must estimate the time required to travel to his destination and will set that time into the clock-timer 84. Upon such actuation of the clock-timer, the switch 82 will be opened and a second switch 98 will be closed.

The opening of switch 82 will disconnect the motion-detecting switch 80 from from the alarm relay 32; however, the closing of switch 98 will connect the alarm relay to a second circuit with a further switch in the form of tamper switch 100 and a third circuit with a trap lock switch 102. Should either the trap lock switch 102 or the tamper switch 100 be closed when switch 98 is closed, the alarm will be sounded. The trap lock switch 102 is a key-operated switch and may be opened only when the alarm key 24 is actually located within the switch 102. The alarm key 24 cannot be removed from the switch 102 while the switch is opened. Thus, the alarm key 24 must be in the trap lock switch 102 when the clock-timer 84 is actuated and must remain in the trap lock switch during the selected interval of time in order to preclude actuation of the alarm. The trap lock switch 102 is preferably located within the housing 88 of the control box 86 so that the alarm key 24 must be in a given location during the operation of the truck and must remain in that location, the location preferably being within the control box.

The tamper switch 100 is also located in the control box 86 and is operated in response to the opening or closing of the access door 90 by virtue of a plunger 104 which extends through the front panel 106 of the control box 86 and which is engaged by a corresponding projection 108 on the access door 90. Thus, when the door 90 is closed, the tamper switch 100 is in the open position. When the access door 90 is opened the tamper switch 100 is closed. Should the access door be opened at any time other than when the clock-timer 84 is at rest, the alarm will sound.

In order to enable the vehicle operator to open the access door 90 and set the clock-timer 84 for a prescribed timed interval, the alarm system 10 is provided with a third switch in the form of push-pull switch 110 which is also mounted within the control box 86 and which has a control knob 112 which projects through the front panel 106 of the control box. By pulling on the knob 112, the vehicle driver can operate the push-pull switch 110 to a first position, illustrated by the dashed-line position in FIG. 1, to disconnect switch 98 from the alarm relay 32 and connect the alarm relay 32 to the motion-detector switch 80. When the push-pull switch 110 is in such a first position the clock-timer 84 may be actuated without sounding the alarm since both the trap lock switch 102 and the tamper switch 100 will be disconnected from the alarm relay. However, movement of the vehicle without sounding the alarm will still be precluded by the motion-detector switch 80 which will still be connected to the alarm relay 32 through push-pull switch 110 rather than through switch 82.

Figure 4:
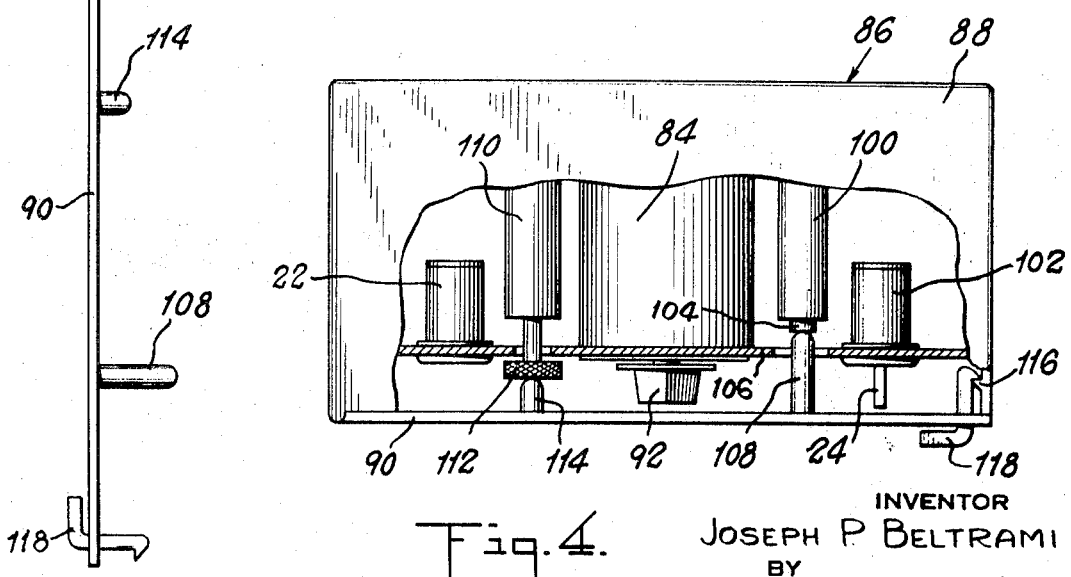
FIG. 4 is a view similar to that of FIG. 3, but with the access door of the control box closed.

In order to disconnect the motion-detector switch 80 from the alarm relay 32, the access door 90 must be closed, as seen in FIG. 4. As the access door 90 is closed, the projection 108 will push the plunger 104 to open the tamper switch 100. After the tamper switch 100 is thus opened, a second projection 114 carried by the access door 90 will push knob 112 to actuate the push-pull switch 110 to the second position thereof, as illustrated by the full-line position in FIG. 1, thereby disconnecting the motion-detecting switch 80 from the alarm relay 32 and connecting the alarm relay with switch 98. Assuming that the clock-timer 84 has been actuated and is therefore not at rest when the access door 90 is closed, both switch 82 (a fourth switch) and the push-pull switch 110 will be open when the door 90 is closed and the motion-detector switch 80 will be isolated from the alarm circuit. Assuming also that the trap lock switch 102 has been opened by placing the alarm key 24 in the trap lock switch, and the tamper switch 100 is opened just prior to actuation of the push-pull switch 110 from the first position to the second position thereof, neither the trap lock switch 102 nor the tamper switch 100 will be effective to sound the alarm while the access door 90 is closed and the vehicle may be driven. The access door is retained in a closed position by a door latch mechanism 116 and may be opened by operating door handle 118.

The master switch 20, driver switch 22, OUT switch 70 and trap lock switch 102 are all conveniently located within the control box 86 together with the clock-timer 84 so that installation of alarm system 10 is both convenient and practical. However, for convenience, the master switch 20 may be located externally of the control box 86 so that the entire alarm system 10 may be deactivated at the vehicle terminal.

Should the vehicle be intercepted by a hijacker along the route traveled by the vehicle, the vehicle operator will be unable to deactivate the cab door switches 14 and 16 without sounding the alarm since the alarm key 24 cannot be retrieved from the trap lock switch 102 without first opening the access door 90, which would close the tamper switch 100 and actuate the alarm, or without removing the alarm key 24 from the trap lock switch 102 and thus actuating the alarm. Likewise, the interval of time originally set into the clock-timer 84 cannot be changed without sounding the alarm since access to the clock-timer may be gained only by opening the access door 90 and thereby closing the tamper switch 100. Since only one alarm key 24 is issued to a driver, the alarm system cannot be deactivated during the timed interval. Hence, the driver cannot be forced by a hijacker to deactivate the alarm system.

Should the hijacker attempt to hijack the truck by stopping the truck and opening a cab door, a cab door switch 14 or 16 will be activated to sound the alarm siren 12. Should the hijacker attempt to coerce the driver to pass the alarm key 24 out of the cab so that the alarm can be deactivated by using the IN switch 68, he will be unsuccessful since the alarm key 24 is captured within the trap lock switch and within the control box 86. Should the hijacker attempt to determine how much time remains in the duration of the interval so as to evaluate whether or not it would be feasible for him to wait until the clock-timer 84 returns to the rest position, he will be unable to observe the pointer 94 and the scale 96 without opening the access door 90. Should the hijacker attempt to open or destroy the control box 86 by impact, the tamper switch 100 will sense the impact and actuate the alarm to sound the alarm siren 12. Thus, the hijacker should find that the alarm system 10 presents a sufficient deterent to his quick entry into the truck and quick departure with the goods carried by the truck to discourage him from carrying out the hijacking.

When the vehicle arrives at its destination, the clock-timer 84 will come to rest thereby opening the switch 98 to disconnect the trap lock switch 102 and the tamper switch 100 from the alarm relay 32. Thus, the access door 90 may be opened and the key 24 may be retrieved. A warning bell 120 is connected for actuation by the clock-timer 84 at five minutes prior to the arrival of the clock-timer at its rest position. Thus, should the driver of the vehicle initially under-estimate the time needed to arrive at the vehicle's destination, the driver may park the vehicle and wait until the clock-timer comes to rest. The arrival of the clock-timer at the rest position will be indicated by a second bell 122. Upon hearing the second bell 122, the driver will know that the clock-timer 84 has reached its rest position and that the access door 90 may be opened without sounding the alarm. He may then open the door and reset the clock-timer for the additional time necessary to reach his destination. Should the driver over-estimate the time needed to arrive at his destination, he may wait until the complete timed interval has elapsed; however, since it is likely that a second alarm key 24 or a master key will be present at his destination the entire alarm system may be deactivated upon arrival, should the master switch 20 be located outside of the control box 86.

It will be apparent that the alarm system described above provides protection against hijacking, as well as against ordinary stealing and burglary, in that the alarm circuit cannot be deactivated by coersion of the operator of the vehicle and must be activated before the vehicle can be operated. When the vehicle is unattended, the alarm system may be activated externally independent of the timing means, so as to serve in the same manner as a conventional vehicle alarm system.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An anti-hijacking vehicular alarm system in which an alarm is to be actuated upon unauthorized opening of a door of the vehicle, said alarm system comprising:
   alarm circuit means for actuating the alarm in response to the opening of a vehicle door;
   operator means for selectively activating or deactivating the alarm circuit means;
   timer means capable of being actuated to operate for a selected interval of time;
   means for precluding operation of said operator means during said selected interval of time without actuation of said alarm; and
   means for precluding alteration of the duration of said selected interval of time during said interval without actuation of said alarm.

2. The alarm system of claim 1 wherein the vehicle has an ignition circuit and including means for deactivating said ignition circuit upon actuation of the alarm.

3. The alarm system of claim 1 wherein:
   said operator means is operated by a key; and
   said operation-precluding means includes means responsive to the absence of said key from a given location during said interval of time for actuating the alarm.

4. The alarm system of claim 1 wherein said timer means includes a manually operated timing device and said duration alteration-precluding means includes
   means for closing off manual access to said timing device; and
   tamper means responsive to the opening of said closing-off means during said interval of time for actuating the alarm.

5. The alarm system of claim 4 wherein:
   said timing device is operated by a manual actuator;
   said closing-off means includes an enclosure which precludes manual access to said actuator, said enclosure having an access door for enabling selective access to said actuator; and
   said tamper means includes means responsive to the opening of said door during said interval of time for actuating the alarm.

6. The alarm system of claim 5 including means for selectively deactivating said tamper means when the access door is open and responsive to the closing of the access door to activate the tamper means when the door is closed during said timed interval.

7. The alarm system of claim 5 wherein:
   said operator means is operated by a key; and
   said operation-precluding means includes means responsive to the absence of said key from a given location within said enclosure during said interval of time for actuating the alarm.

8. The alarm system of claim 7 including means for deactivating said tamper means when the access door is open and responsive to the closing of the access door to activate the tamper means when the door is closed during said timed interval.

9. The alarm system of claim 1 including means for precluding movement of said vehicle without actuation of the alarm when the timer means is not actuated to operate for said interval of time.

10. The alarm system of claim 9 wherein said movement-precluding means includes means responsive to motion of the vehicle, said alarm system including means connecting said motion-responsive means and the alarm when said timer means is not actuated and disconnecting said motion-responsive means from the alarm when said timer means is actuated.

11. An anti-hijacking vehicular alarm system in which an alarm is to be actuated upon unauthorized opening of a door of the vehicle, said alarm system comprising:
- an electrically operated alarm;
- a first circuit for actuating the alarm in response to the opening of a vehicle door;
- a first switch;
- a key for selectively operating said first switch to connect or disconnect the first circuit and the alarm;
- a timing device including a manually operated actuator such that the timing device is capable of being manually actuated for operation through a selected interval of time at the end of which interval said timing device comes to rest;
- an enclosure, said enclosure having an access door for precluding manual access to said actuator when closed and for enabling access to the actuator when open;
- a second circuit for actuating the alarm when said access door is open;
- a third circuit for actuating the alarm in the response to the absence of the key from a given location;
- a second switch operated by the timing device for connecting the second and third circuits with the alarm during the interval of time and for disconnecting the second and third circuits from the alarm when the timing device is at rest;
- a third switch between the second switch and the alarm for operation between a first position wherein the second switch is disconnected from the alarm and a second position wherein the second switch is connected to the alarm; and
- means for precluding operation of the third switch to the first position thereof when the access door is closed.

12. The alarm system of claim 11 including:
- a fourth circuit for actuating the alarm in response to movement of the vehicle;
- a fourth switch operated by the timing device for connecting the fourth circuit and the alarm when the timing device is at rest and for disconnecting the fourth circuit from the alarm upon actuation of the timing device;
- said fourth switch connecting the fourth circuit to the alarm when said third switch is in said first position.

13. The alarm system of claim 11 wherein the vehicle has an ignition circuit and including means for deactivating said ignition circuit upon actuation of the alarm.

14. The alarm system of claim 11 wherein said given location of the key is within said enclosure.

15. The alarm system of claim 11 wherein:
- said third switch is actuated from the first position to the second position thereof in response to closing of the access door;
- said second circuit includes a further switch responsive to the position of the access door such that the second circuit is open when the door is closed and closed when the door is open; and
- said system includes means responsive to closing of the access door for actuating the further switch to open the second circuit and subsequently actuating the third switch to the second position thereof.

* * * * *